Feb. 10, 1925.
H. AHLQVIST
1,526,197
CLARIFICATION PROCESS AND APPARATUS
Filed Aug. 18, 1923
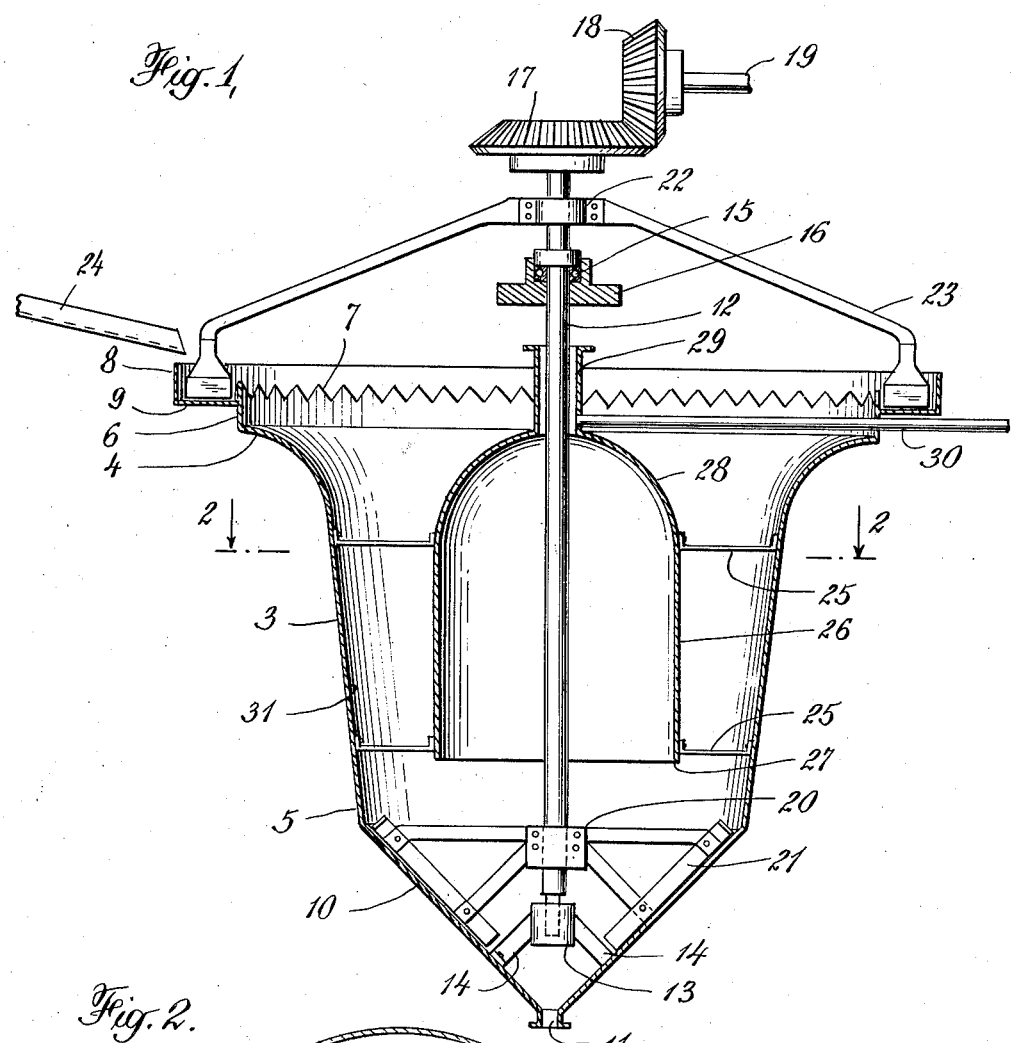
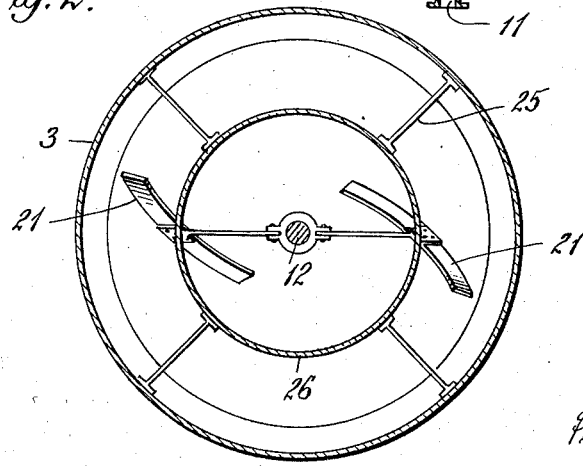
INVENTOR
Harald Ahlqvist
BY Pennie, Davis, Marvin & Edmonds
his ATTORNEYS Patented Feb. 10, 1925.

1,526,197

UNITED STATES PATENT OFFICE.

HARALD AHLQVIST, OF NEW YORK, N. Y.

CLARIFICATION PROCESS AND APPARATUS.

Application filed August 18, 1923. Serial No. 658,192.

*To all whom it may concern:*

Be it known that I, HARALD AHLQVIST, a citizen of the United States, residing at New York, in the county of New York, State of New York, have invented certain new and useful Improvements in Clarification Processes and Apparatus; and I do hereby declare the following to be a full, clear, and exact description of the invention, such as will enable others skilled in the art to which it appertains to make and use the same.

This invention relates to a clarification process and apparatus which is applicable for the treatment of liquor containing suspended solids which is to be clarified by settling or decantation. Such liquors result from various chemical and mining operations and particularly in the paper industry. In many instances such liquors contain valuable suspended materials which are to be recovered, while in other cases the suspended solids constitute the waste material, and it is desirable to remove such solid constituents so that the clarified liquor may again be used. Another example of a process in which such liquor is formed is that of causticizing with lime. The caustic liquors resulting from this process are ordinarily clarified or settled in commercial operation.

The object of this invention is to provide a new and improved clarification process and apparatus by means of which settling or decantation operations may be readily carried on. The more specific object of the invention is to provide such a process and apparatus by means of which a rapid and complete clarification may be obtained with the maximum recovery both of the suspended material and the liquor. This process and apparatus are particularly applicable to the caustic soda industry. In practicing the process the settling of the solids occurs rapidly during the first steps of the process and the mud so formed flows in the same direction as the liquor. The mud, however, flowing along with the liquor is not obliged to pass through the main body of the liquor in settling to the point where it may be collected. During the process the liquor is caused to change the direction of its flow and to flow along its previous path but in a stream which is kept distinct from the first stream, the mud being collected at a point beyond the region in which the reversal of flow occurs. The process is carried on by causing the unclarified liquor to flow with uniform distribution over converging surfaces, and the settling of the mud occurs on these surfaces, the first settling near the point of distribution being rapid. The settled mud then flows down the surfaces without again mingling with the liquor, while, after traversing the surfaces, the liquor is caused to counterflow to an outlet located slightly below the region of distribution. The two streams of liquor are kept separate by means of a barrier along the edge of which the direction of flow of the liquid occurs, and the mud continues in the same direction toward an outlet through which it may be withdrawn.

A convenient form of apparatus, by means of which the process may be carried on, comprises a somewhat conical vessel provided with a device along its rim by means of which a uniform distribution of the unclarified liquor may be brought about. As the liquor traverses these side walls the mud settles out and flows along them and near the point of convergence the liquor changes the direction of flow and passes along the axis of the vessel in a stream which is separated from the entering liquor. The latter accordingly forms a somewhat annular stream and the liquor which is flowing in the reverse direction toward the outlet is in a somewhat cylindrical stream.

That form of apparatus which is now preferred is illustrated in the accompanying drawings, in which—

Fig. 1 shows a vertical cross-section of the apparatus, and

Fig. 2 shows a transverse cross-section on the line 2—2 of Fig. 1.

With reference now to these drawings, the apparatus is seen to consist of a vessel 3, of a slightly conical form, the slope of the side walls thereof being progressively flattened from bottom to top. Near the upper margin of the vessel as at 4, it will be seen that the walls lie nearly horizontal, while near the lower end, as at 5, the walls are nearly vertical. This change in slope from the region 4 to the region 5 occurs almost entirely within a comparatively short length of the vessel near its upper end. While the vessel is shown as being cylindrical, this particular shape is not essential but simply more convenient for many purposes. Other shapes may be used to equal advantage so far as the settling operation is concerned, although the inclination of the slope of the side walls should follow fairly closely the inclination here illustrated. This vessel is made of any suitable material which will depend on the character of the liquor which is to be treated. For caustic liquors a steel vessel is satisfactory but for other liquors which would act on steel it is necessary to enamel it or to use some other material which will be inert to the liquor treated.

At the upper rim of the vessel the side wall terminates in an up-standing flange or rim 6, this rim having a serrated edge 7 and extending around this edge and having a side wall higher than the edge, is a launder 8. The top edge of the vessel serves as the inner wall of the launder and the bottom wall 9 of the launder may be either rounded or flat for a purpose later described.

At its lower end the vessel terminates in a cone 10 and this conical member may be formed integrally with the vessel or may be a separate part suitably attached thereto. The apex of the cone is formed to provide an outlet 11. Extending into the vessel centrally thereof is a shaft 12 the lower end of which is supported in a step bearing 13 mounted in arms 14 extending upwardly and inwardly from the inner face of the the cone, the upper end of the shaft being journaled in a ball bearing 15 mounted in a fixed member 16 of any desired construction. At its upper end the shaft is provided with a beveled gear 17 meshing with a similar gear 18 mounted in a shaft 19 driven from any convenient source of power. Near the lower end the shaft is provided with a scraper 20 having one or more blades 21. These blades run close to the inner face of the cone and may be straight or curved, the top end of each blade, however, being bent forward in the direction of rotation of the shaft. Near the upper end the shaft carries a scraper 22 having one or more blades 23 which extend down into the launder 8 Unclarified liquor is supplied to the launder through one or more pipes 24 and this liquor flows over the serrated edge 7 into the vessel. The revolution of the shaft carrying blades 23 keeps the launder free of sediment and by causing the vessel to be fed from the overflow from the launder the unclarified liquor is uniformly distributed over the side walls of the vessel.

Supported in any convenient manner within the vessel as by arms 25, is a cylindrical tank 26. The tank extends co-axially with the shaft 12 and terminates at its end 27 at a point spaced somewhat above the upper end of the cone 10. At its upper end the tank terminates in a conical or dome-like surface 28 which in turn connects with a riser 29 which extends above the outer edge of the launder. From the side of this riser extends an outlet conduit 30 so located as to lie somewhat below the lower wall of the launder, as is illustrated. The clarified liquor is to be withdrawn through this conduit and the rate of flow through the pipes 24 and the rate of withdrawal is so proportioned that the liquor will flow through the vessel at a low velocity.

As will be seen, the liquor which enters the vessel is uniformly distributed along the upper ends of the side walls thereof and passes downward in a sleeve-like stream occupying the space indicated generally by the reference character 31. The liquor then flows around the end 27 of the tank and then flows upwardly in a somewhat cylindrical stream along the axis of the vessel to the top of the tank, thence through the riser 29 and out through the outlet conduit 30. The relative dimensions of the tank and vessel are such that the cross-sectional area of the tank is as large as the smallest cross-sectional area of the annular space 31, and the lower end of the tank is spaced from the bottom by a sufficient distance so as not to restrict the flow of liquor in passing from this annular space upwardly into the tank. For this purpose the dimensions of the parts and their location is such that the cross-sectional area of the tank is equal to or less than the surface area of the cylindrical surface lying between the end of the tank and the bottom of the vessel.

In operation, the unclarified liquor is introduced into the launder through one or more of the supply pipes 24 and the shaft 12 caused to rotate. This liquor is uniformly distributed throughout the launder and passing over the serrated edges 7 flows with uniform distribution down the sides of the vessel 3. The revolution of the scraper blades 23 insures that the launder will not be clogged by sediment and therefore maintains the distribution uniform at all times. As the liquor commences to flow down the sides of the vessel it first passes over those portions of the surfaces which have the smallest inclination. The suspended solids immediately settle out on this surface and flow down the sides thereof, eventually passing into the conical chamber at the bottom. Sedimentation also occurs throughout the annular stream of liquor introduced, the suspended solids gradually settling into the cone and as the liquor fills the vessel it rises within the tank, eventually filling it, and then passing out through the outlet conduit. The liquor inside the tank becomes more and more clarified as it travels toward the outlet opening and as the ability of the liquor to carry suspended solids in it depends on its rate of flow the rate of introduction into the settler will necessarily be quite slow.

As the mud collects along the walls of the chamber, it flows of its own gravity toward the discharge opening, being assisted through the outlet 11 by the scraper blades 21, which are so formed as to give it a downward movement. The separated mud is withdrawn and disposed of in any desired way, and the clarified liquor, passing out through the outlet pipe 30, may be conveyed to a storage tank or such other use made of it as is desired. In ordinary practice one passage of the liquor through the clarifying vessel will be sufficient in many cases, but under special circumstances it may be found desirable to connect two or more of the vessels in series and subject the liquor removed from one to further clarification treatment.

It will be seen that the liquor flows into the annular space at a relatively slow rate, and due to the decreasing size of this space the velocity of flow gradually increases. The mud settles out on the walls, the first settling occurring where the velocity of flow of the liquor is the lowest, and this settled mud may proceed to the outlet without being obliged to pass through the main body of the liquor. The settling occurs rapidly on the sloping surface and the inclined surfaces here provided permit of the settling of the largest proportion of the mud and that proportion which contains the heaviest particles taking place where the greatest settling area is provided. The particles not settled in the region of introduction of the liquor continue to undergo settling during the descent of the liquor and the change of direction of flow of the latter, which is provided in this process, has a desirable effect in throwing out suspended solids. The velocity of upward travel is substantially equal to the velocity of the liquor at the point where the annular space is most constricted and as the liquor approaches the top of the tank the space which it occupies is uniformly contracted. It will accordingly be seen that the liquor is uniformly distributed over surfaces which result in rapid settling at the start of the process, followed by settling which becomes gradually slower, and the mud separated out as the process proceeds is not again mingled with the clear liquor, but is permitted to proceed directly to its outlet. At the termination of the treatment the liquor withdrawn is discharged from the stream which is of great clarity and of uniform character.

I claim:

1. A process for the clarification of liquids containing solids in suspension, which comprises flowing the liquid over surfaces converging in the direction of flow and causing the liquid to counterflow in a stream of substantially uniform cross section.

2. A process for the clarification of liquids containing solids in suspension, which comprises flowing the liquid with uniform distribution over surfaces converging in the direction of flow, and causing the liquid to counterflow past the said surfaces in a substantially distinct stream of substantially uniform cross section.

3. A process for the clarification of liquids containing solids in suspension, which comprises flowing the liquid over surfaces converging in the direction of flow and causing the liquid to counterflow past other surfaces which lie substantially parallel to the axis of the counter flowing stream.

4. A process for the clarification of liquids containing solids in suspension, which comprises flowing the liquid with uniform distribution over inclined surfaces converging in the direction of flow, and causing the liquid to counterflow in a substantially distinct stream, the two streams being concentrically arranged and the counterflowing stream having a substantially uniform cross section throughout the greater part of its length.

5. A process for the clarification of liquids containing solids in suspension, which comprises flowing the liquid over surfaces converging in the direction of flow with uniform distribution and progressively increasing velocity, and causing the liquid to counterflow past the said surfaces in a substantially distinct stream of substantially uniform cross section.

6. A process for the clarification of liquids containing solids in suspension, which comprises flowing the liquid with uniform distribution over surfaces converging in the direction of flow, causing a counterflow of the liquid past the said surfaces in a distinct stream of substantially uniform cross section, and collecting the separated solids at a point spaced beyond the point where the reversal in the direction of flow takes place.

7. A process for the clarification of liquids containing solids in suspension, which comprises flowing the liquid over surfaces converging in the direction of flow, causing a counterflow over other surfaces which lie substantially parallel to the axis of the counterflowing stream, the two streams being maintained separate, collecting separated solids at a point beyond the point where the direction of flow of the liquid is reversed, and withdrawing the clarified liquid at a level near its admission to the surfaces first mentioned.

8. A process for the clarification of liquids containing solids in suspension which comprises flowing the liquid between surfaces converging in the direction of flow of the liquid, one of the surfaces being vertical, then counterflowing the liquid past the vertical surface in a stream of substantially uniform cross-section.

9. Apparatus for the clarification of liquids containing suspended solids, comprising a vessel having an inclined converging side wall, means for introducing liquid into the vessel over the entire side wall with uniform distribution at the end of the side wall remote from the point of convergence, a central outlet in the bottom of the vessel for separated solids and a central outlet near the top of the side wall for clarified liquid.

10. Apparatus for the clarification of liquids containing suspended solids, comprising a vessel having an inclined converging side wall, means for introducing liquid into the vessel over the entire side wall with uniform distribution at the end of the side wall remote from the point of convergence, means for causing a counterflow of the liquid centrally of the vessel, an outlet for separated solids in the bottom of the vessel and an outlet for clarified liquid near the top of the side wall.

11. Apparatus for the clarification of liquids containing suspended solids, comprising a vessel having a side wall converging from top to bottom, means for introducing liquid into the vessel along the side wall near the top of the latter and with uniform distribution thereover, a central outlet in the bottom of the vessel for separated solids and a central outlet near the top for clarified liquid.

12. Apparatus for the clarification of liquids containing solids in suspension comprising a vessel having an inclined converging side wall of increasing steepness from top to bottom, means for dividing the vessel into two compartments, means for introducing liquid into one compartment along the inclined wall at the end thereof remote from the point of convergence with uniform distribution thereover, means for withdrawing liquid from the other compartment and means for withdrawing the separated solids from the vessel.

13. Apparatus for the clarification of liquids containing solids in suspension comprising a vessel having an inclined converging side wall, means for dividing the vessel into two compartments, means for causing the liquid to enter the vessel along the inclined wall with uniform distribution thereover, and to flow through the compartments in opposite directions, and means for withdrawing the separated solids from the vessel.

14. Apparatus for the clarification of liquids containing solids in suspension comprising a vessel having an inclined converging side wall, means for dividing the vessel into inner and outer compartments communicating at their lower ends, means for introducing liquid into the upper end of the outer compartment along the inclined wall with uniform distribution thereover, means for withdrawing liquid from the upper end of the inner compartment, and means for withdrawing the separated solids from the vessel.

15. Apparatus for the clarification of liquids containing solids in suspension comprising a vessel having an inclined converging side wall, means for dividing the vessel into two concentric compartments, communicating at their lower ends, the maximum cross-sectional area of the inner compartment being not less than the minimum cross-sectional area of the outer compartment, means for introducing liquid into the outer compartment along the inclined wall with uniform distribution thereover, means for withdrawing liquid from the upper end of the inner compartment and means for withdrawing separated solids from the vessel.

16. Apparatus for the clarification of liquids containing solids in suspension comprising a vessel having an inclined converging side wall, a launder extending around the upper edge of this wall, an open end tank supported in the vessel in spaced relation to the wall and with its open end down, means for introducing liquid from the launder into the vessel along the side wall with uniform distribution thereover, an outlet from the vessel located at the end of the inclined wall and an outlet from the closed end of the tank.

17. Apparatus for the clarification of liquids containing solids in suspension comprising a vessel of inverted bell shape, a launder extending around the open end of the vessel, a driven shaft supported in the vessel and provided with stirring means entering the launder, a bell-shaped tank supported in the vessel about the shaft with its open end down, an outlet conduit communicating with the upper end of the tank, an outlet from the lower end of the vessel, and agitating means mounted on the shaft adjacent the outlet.

18. Apparatus for the clarification of liquids containing solids in suspension comprising a vessel of inverted bell-shape terminating at its closed end in a cone provided with an outlet, a launder mounted on the outer wall of the vessel adjacent its rim, a driven shaft supported concentrically of the vessel and provided with a plurality of paddles extending into the launder, a bell-shaped tank supported in the vessel about the shaft with its open end spaced from the walls of the vessel, an outlet conduit from the tank at its upper end, and a plurality of paddles on the lower end of the shaft for moving the separated solids through the outlet.

19. Apparatus for the clarification of liquids containing solids in suspension comprising a vessel having its side wall inclined inwardly and downwardly, the inclination being relatively slight near the upper end of the vessel, and increasing rapidly toward the lower end of the vessel, means for introducing unclarified liquid into the vessel with uniform distribution along the top of the wall, an outlet in the lower end of the vessel for separated solids, and means for withdrawing clarified liquid from the vessel centrally of its upper end.

In testimony whereof I affix my signature.

HARALD AHLQVIST.